Figure 1:
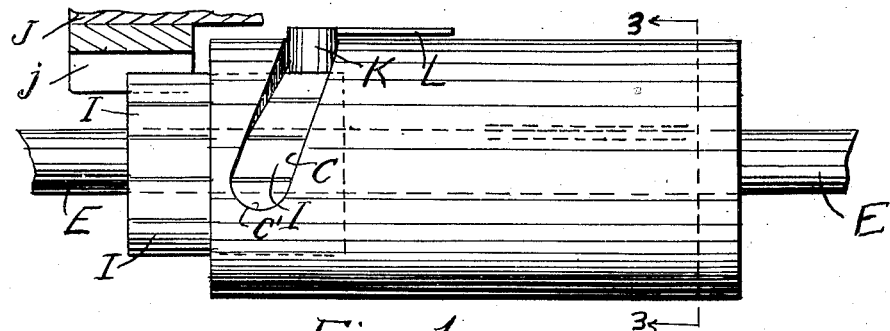

Nov. 24, 1925.

1,562,683

O. BRISBOIS

DRIVE FOR STARTING INTERNAL COMBUSTION ENGINES

Original Filed Nov. 3, 1921

Odilon Brisbois,
Inventor,

By Charles Turner Brown,
Atty.

Patented Nov. 24, 1925.

1,562,683

UNITED STATES PATENT OFFICE.

ODILON BRISBOIS, OF CHICAGO, ILLINOIS.

DRIVE FOR STARTING INTERNAL-COMBUSTION ENGINES.

Application filed November 3, 1921, Serial No. 512,423. Renewed August 31, 1925.

*To all whom it may concern:*

Be it known that I, ODILON BRISBOIS, a citizen of the United States, and a resident of Chicago, in the county of Cook and State of Illinois, have invented certain new and useful Improvements in Drives for Starting Internal-Combustion Engines, of which the following is a specification.

This invention relates to mechanism which is interposed between a rotatable member of an internal combustion engine and a motor, usually an electrically driven motor, to transmit motion from said motor to said rotatable member, usually the balance wheel of the engine.

Among the objects of this invention is to obtain a mechanism which does not require the use of a yielding member as a spring to prevent the stripping of the gear teeth which are mounted on the rotatable member of the engine, or on a gear pinion intermeshing therewith and driven by a motor, which will not become broken or otherwise injured in case of back fire in the cylinder of the engine while said rotatable member is being driven by the motor; and which will yield so as not to injure or break the motor in case of said back fire. Additional objects are to obtain a mechanism which is simple in construction, of few parts, certain in operation and economical in construction.

I have illustrated a construction embodying this invention in the drawing accompanying and forming a part of this specification, in which—

Figure 2:
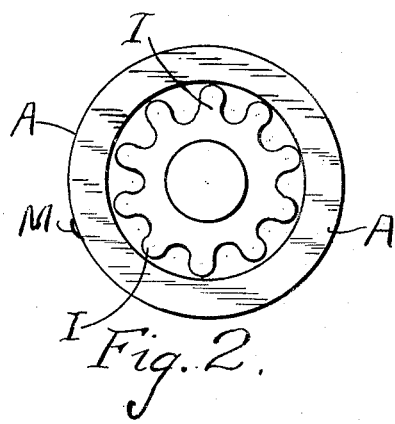
Figure 3:
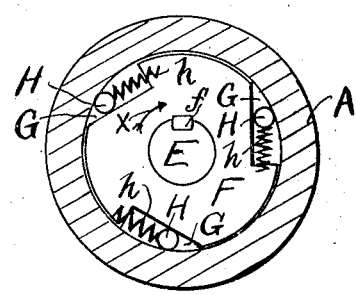
Figure 4:
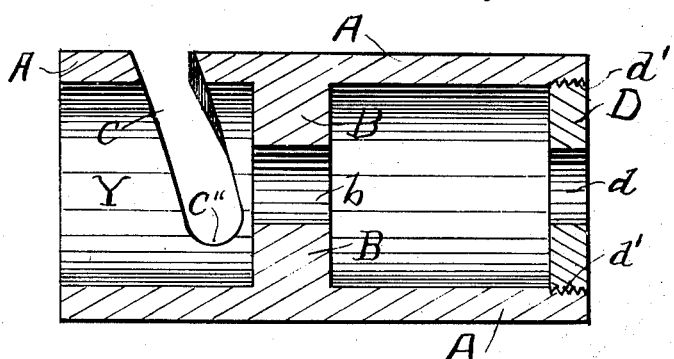

Fig. 1 is a side elevation;

Fig. 2 an end elevation;

Fig. 3 a vertical section on line 3—3 of Fig. 1, viewed as indicated by arrows; and Fig. 4 a vertical longitudinal section of the cylindrical member of the drive.

A reference character applied to designate a given part indicates said part throughout the several figures of the drawing, wherever the same appears.

A represents a cylindrical member; B a partition substantially midway of said cylindrical member, and *b* an aperture in said partition. C represents a spiral slot in the wall of said cylindrical member, to one side of said partition; C' indicating one end of said slot, and C'' the other end thereof, (see Figs. 1 and 4). D represents a removable end to said cylindrical member, on the side of said partition opposite to said spirally extending slot C. End D is provided with external screw threads, *d'* which engage with corresponding internal threads on the inner wall of cylindrical member A; and said end is provided with an aperture *d*. E represents a portion of a motor driven shaft. Apertures *b* and *d*, respectively, fit loosely on shaft E. F represents a hub which is mounted on shaft E, and is contained in the cylindrical member A between the end D and partition B, and *f* represents a key or feather by means of which the hub F is secured to said shaft, to rotate therewith. G, G, G, represents longitudinally extending recesses on the periphery of hub F. H, H, H, represent rollers in said recesses G, G, G, and *h*, *h*, *h*, springs which abut at one end against said rollers and tend to force said rollers into close contact with the inner face of cylindrical member A and the side face of recesses G, G, G. A roller clutch is thus obtained between hub F and cylindrical member A, when shaft E and said hub turn in the direction indicated by arrow X, in Fig. 3. The angle of the side of recess G, with which the roller H is in contact, relative to the inner face of the cylindrical member A, at the point where said rollers contact therewith, controls the load which said clutch will carry, and when an overload occurs, as in the case of a back fire in the engine cylinder, said clutch will give, and permit the cylindrical member A to turn backwards.

I represents a pinion gear wheel, which is loosely mounted on shaft E. J represents a small section of the rim of a balance wheel of an engine, and *j* a gear tooth of a gear ring which is mounted on the balance wheel to turn therewith. K represents an abutment on gear pinion I which is in spirally extending slot C, and moves freely therein from one end thereof to the other. Gear pinion I is longitudinally movable on shaft E, into and out of the chamber Y, (see Fig. 4); said movement out of said chamber being controlled by the rotation of the cylindrical member A, said gear pinion not rotating; and by said longitudinal movement it moves into mesh with the gear teeth (*j*) on the balance wheel J. In Fig. 1 said pinion gear is represented as having been moved partially out of chamber Y and in engagement with said teeth *j*.

L represents a flat spring member which is secured on abutment K to extend parallel to shaft E, and near to contact with the outer surface of the cylindrical member A, and m represents a slight abutment on said cylindrical member, with which abutment said spring L contacts as said cylindrical member commences to rotate when the pinion member is in chamber Y, said pinion being at rest. Abutment M is adjacent to end C″ of slot C, so that when said pinion is in said chamber Y said abutment will prevent the pinion from creeping, (by jars or concussions) out of said chamber to bring the end thereof into contact with the teeth on the balance wheel, said cylindrical member A being at rest. Abutment M, however, is not sufficiently large to prevent its moving under the spring L when the cylindrical member A is started suddenly, by the energizing of the motor which turns shaft E.

The operation of the drive is,—

When shaft E is rotated rapidly by a motor the rotation of cylindrical member A moves the pinion gear I longitudinally on shaft E, into mesh with teeth j, and when said teeth are properly in mesh the end C′ of spirally extending slot C is in contact with abutment K, and continued rotation of said cylindrical member rotates said pinion member and turns the balance wheel J. The sudden start which is given to the pinion member as the abutment K contacts with end C′ of the slot C tends to turn the rollers H, causing a slip to clutch; and said slip is sufficient to prevent the stripping of the teeth j or the teeth of the pinion gear; and the necessity of using a spring is obviated. Also, in case of a back fire in a cylinder of the engine said rollers will give as they contact on lines of such converging tangent as shown in Fig. 3 that they will slip under a predetermined load, said back fire causing an overload thereon, and no injury will be done either on the gear teeth of the engine or pinion, or on any part of the drive or motor which is arranged to drive shaft E.

When the engine is in action the rotation of the balance wheel thereof rotates the pinion at a greater speed than does the shaft E, and the pinion is moved by the slot C longitudinally on the shaft E, out of engagement with the teeth on the balance wheel.

I claim:

1. A rotatably mounted shaft, a cylindrical member, a partition wall and a head at one end of said cylindrical member, said partition wall and said head loosely mounted on said shaft, a spirally extending slot in said cylindrical member, a hub on said shaft secured thereto to turn therewith, said hub provided with longitudinally extending recesses on the periphery thereof, in combination with rollers in said recesses and means to yieldingly maintain said rollers in contact with the inner face of said cylindrical member and one side of said recesses, a gear pinion member loosely mounted on said shaft and an abutment on said pinion member arranged to travel in said slot from one to the other end thereof.

2. A rotatably mounted shaft, a cylindrical member, a partition substantially midway thereof and a head at one end, said partition and head loosely mounted on said shaft, and a spirally extending slot in said cylindrical member, a hub on said shaft, and secured thereto to turn therewith, longitudinally extending recesses on the periphery of said hub, rollers in said recesses and springs arranged to yieldingly hold said rollers in contact with one side of said recesses and the inner face of said cylindrical member, in combination with a gear pinion member loosely mounted concentric to said shaft and an abutment on said pinion member arranged to move freely in said slot and to be turned thereby when at the end of said slot which is adjacent to the open end of said cylindrical member.

3. A rotatably mounted shaft, a cylindrical member provided with a partition substantially midway thereof and with a head at one end, said partition and head loosely mounted on said shaft, a spirally extending slot in said cylindrical member, one end of said slot adjacent to the open end of said member, a hub mounted on said shaft and arranged to travel therewith, a friction connection between said hub and said cylindrical member arranged to rotate said cylindrical member and carry a determined load, when said shaft turns in a given direction, in combination with a gear pinion loosely mounted concentric to said shaft, and an abutment on said pinion member arranged to move in said slot from end to end thereof and to be turned by the contact of said ends therewith.

4. A rotatably mounted shaft, a cylindrical member loosely mounted concentric to said shaft, and a gear pinion member also loosely mounted concentric to said shaft and movable longitudinally into and out of said cylindrical member, in combination with a friction connection between said shaft and said cylindrical member arranged to drive said cylindrical member under a determined load when said shaft turns in a given direction, and a driving connection between said cylindrical member and said pinion member arranged to move said pinion member longitudinally and subsequent to said movement to rotate it.

5. In an engine starter, a shaft, a sleeve member having a spiral slot mounted upon said shaft, a yieldable one-way clutch for operatively connecting said shaft and sleeve, and a gear loosely mounted on said shaft within said sleeve and having a stud projecting through said spiral slot.

6. In an engine starter, a shaft, a gear loosely mounted thereon, a member for automatically connecting said gear and shaft when said shaft is rotated in one direction, and for automatically disconnecting said gear when said shaft rotates in the other direction, said member being so constructed as to break its driving connection with said shaft under a predetermined load when said shaft is in driving relation with said member.

7. In an engine starter, a shaft, a driving member loosely mounted upon said shaft, and a unidirectional clutch for automatically connecting said shaft and driving member when said shaft is rotated in one direction and adapted to yield in the event of a back kick of the engine.

8. In an engine starter, a shaft, a gear loosely mounted upon said shaft, and having a stud, a sleeve having a spiral slot mounted upon said shaft and receiving said stud, and a roller clutch between said shaft and sleeve adapted for automatically forming a connection between said sleeve and shaft when said shaft is rotated in one direction and adapted to yield under a predetermined load.

ODILON BRISBOIS.